United States Patent [19]

Inoue

[11] Patent Number: 4,605,834
[45] Date of Patent: Aug. 12, 1986

[54] PRECISION TW ELECTROEROSION WITH STAGGERING MULTIPLE V-NOTCHED GUIDES

[75] Inventor: Kiyoshi Inoue, Tokyo, Japan

[73] Assignee: Inoue-Japax Research Incorporated, Japan

[21] Appl. No.: 694,811

[22] Filed: Jan. 25, 1985

[30] Foreign Application Priority Data

Nov. 8, 1983 [JP] Japan .................. 58-210374
Dec. 3, 1983 [JP] Japan .................. 58-228850
Jan. 26, 1984 [JP] Japan .................. 59-13162

[51] Int. Cl.⁴ .......................................... B23H 7/10
[52] U.S. Cl. .............................. 219/69 W; 204/206
[58] Field of Search ............. 219/69 W; 76/107 R, 76/107 A; 204/206

[56] References Cited

U.S. PATENT DOCUMENTS

| 567,606 | 9/1896 | McCool et al. ............. 76/107 A |
| 1,395,217 | 10/1921 | Begot ........................... 76/107 A |
| 2,058,110 | 10/1936 | Schroter et al. ............. 76/107 A |
| 2,149,330 | 3/1939 | Blount ........................... 76/107 A |
| 4,205,212 | 5/1980 | Ullmann et al. ............ 219/69 W |
| 4,250,371 | 2/1981 | Haug et al. .................. 219/69 W |
| 4,453,070 | 6/1984 | Bonga ........................... 219/69 W |

FOREIGN PATENT DOCUMENTS 150936 11/1980 Japan .......................... 219/69 E
56-56346 5/1981 Japan .......................... 219/69 W Primary Examiner—Clarence L. Albritton
Assistant Examiner—Geoffrey S. Evans
Attorney, Agent, or Firm—Finnegan, Henderson, Farabow, Garrett & Dunner

[57] ABSTRACT

A traveling-wire (TW) electroerosion apparatus in which at least one of wire guides which are disposed at opposite sides of the cutting zone includes a plurality of elementary guide members arranged one adjacent to another in the direction of wire travel and having wire-receptive notches, the notched members being staggered to make up a composite guide opening of these notches such that the diameter of an imaginary cylinder which can be inscribed therein is substantially equal to the nominal wire diameter. Preferably, the elementary guide members are arranged to be displaceable relative to one another and in their respective planes, which are parallel to one another, to change the positions of these guide notches and thus to change the diameter of the imaginary cylinder.

2 Claims, 7 Drawing Figures

PRECISION TW ELECTROEROSION WITH STAGGERING MULTIPLE V-NOTCHED GUIDES

FIELD OF THE INVENTION

The present invention relates to traveling-wire (TW) electroerosion and, more particularly, to an apparatus for electroerosively cutting an electrically conductive workpiece with a continuous wire electrode in which the accuracy of cutting and the performance of traveling-wire electroerosion are markedly improved.

BACKGROUND OF THE INVENTION

The process of TW-electroerosion generally makes use of a continuous electrode wire which is typically circular in cross section and composed of, say, brass or copper, or brass- or copper-coated steel, the wire having a thickness or diameter generally ranging between 0.05 and 0.5 mm. The electrode wire is axially transported continuously from a wire supply to a wire takeup through a cutting region in which a workpiece is disposed. The cutting region is commonly defined between a pair of guide means which support and hold the wire traveling through the workpiece. Wire traction and braking means allow the continuous wire to be tightly stretched and kept taut under a given tension and to be axially driven between the cutting guide members while traversing the workpiece, thus presenting a continuously renewed electrode surface juxtaposed in an electroerosive cutting relationship with the workpiece across a narrow gap or cutting zone. The cutting zone is flushed with a cutting liquid medium, e.g. water, and is electrically energized with a high-current density electrical machining current which is passed between the electrode wire and the workpiece to erode the latter or erosively remove material therefrom.

The cutting process may be performed in any of various electroerosive machining modes. In electrical discharge machining (EDM), the cutting liquid is a dielectric liquid, e.g. deionized water, and the machining electric current is supplied in the form of a succession of electrical pulses. In electrochemical machining (ECM), the cutting medium is a liquid electrolyte, e.g. an aqueous electrolytic solution of high conductivity, and the machining current is a high-amperage continuous or pulsed current. In electrochemical-discharge machining (ECDM), the liquid medium has both electrolytic and dielectric natures and the machining current is preferably applied in the form of pulses which facilitate the production of electric discharges through the weekly conductive liquid medium.

The workpiece may be disposed in a bath of the cutting liquid medium to immerse the cutting region therein. More typically, however, the cutting zone is disposed in the air or usual environment. Advantageously, one or two nozzles of the conventional design are disposed at one or both sides of the workpiece to deliver the cutting liquid medium into the cutting region disposed in the air or immersed in the liquid medium. The cutting liquid medium is conveniently water as mentioned, which is deionized or ionized to a varying extent to serve as a desired electroerosive cutting medium.

To advance electroerosive material removal in the workpiece, the latter is typically displaced relative to the traveling wire and transverse thereto. This allows the traveling wire to advance translationally in the workpiece and consequently a narrow cutting slot to be progressively formed behind the advancing wire, the slot having a width substantially greater than the thickness of the wire. The continuous relative displacement along a precision-programmed path results in the formation of a desired contour corresponding thereto and defined by this cutting slot in the workpiece.

Higher cutting speed in the process described is ever an increasing demand in the industry and is desirable to achieve with due precision. The cutting speed, typically expressed in mm$^2$/min, is defined by the product of the workpiece thickness and the length of cut achieved per unit time along a given course and hence is, for a given workpiece thickness, dependent upon the rate of translational advance of the wire electrode that can be increased. The rate of advance is in turn limited by the rate of actual material removal dependent on the one hand upon the preset cutting parameters that govern, inter alia, the cutting accuracy and on the other hand upon the conditions in the cutting zone which may instantaneously vary. If the rate of advance happens to exceed the rate of actual material removal, the fine wire comes to break. The goal of higher cutting speed, is, therefore, dependent on the extent to which optimum conditions in the cutting zone may be established and may be maintained stably against instantaneous changes.

In the interest of increasing the cutting accuracy in the TW-electroerosion process, it has been commonly recognized in the art that each of the wire guides disposed at opposite side of the workpiece have advantageously a so-called "die guide" structure with a small opening adapted to guidingly accept the traveling wire therein. A "die" opening is circular to conform with the wire which is circular in cross section as is common. Since the traveling wire stretched under tension remains confined within the opening, it does not come off fatally. When this structure is applied to the two guides, the centers of these openings establish the straight line for the axis of the wire when traveling through the cutting zone to coincide with. As can be seen, it is desirable that the clearance between the wire and the wall of the guide opening be minimized so that the wire axis may suffer a minimal deviation from the straight line established by the centers of these openings. On the other hand, the guide opening must be large enough to allow the wire to be readily threaded or introduced. Thus, for example, for a wire of 0.2 mm diameter, a guide opening of a diameter as large as 0.21 mm has often been found to be inadequate.

The need for larger clearance also arises especially with respect to the "die" guide at the downstream side of the cutting zone. The wire emerging from the cutting zone shows its surface substantially roughened and small pits and projections formed thereon as are typical in rough EDM operations. If such projections are large enough, the wire will be caught in the opening so that its length in the cutting zone becomes slack, causing a short-circuit with the workpiece. Then the wire will break.

As can readily be seen, the larger the clearance, greater the guiding inaccuracy and hence the inferior the machining accuracy. In an electroerosive cutting operation, there develops in the cutting zone a machining pressure (e.g. due to machining discharges) in the direction which is opposite to the cutting direction, thus tending to deflect the wire backwards. As a result, the wire in each of the guide openings will be forced to assume a deviated position with respect to the cutting direction, in spite of high tension applied to the wire to maintain it as straight as possible across the cutting zone. It can therefore be seen that there results a wire guiding inaccuracy and hence a machining inaccuracy which proportionally increases with an increase in the clearance or in the diameter of each guide opening.

OBJECTS OF THE INVENTION

Accordingly, the present invention seeks to provide a TW-electroerosion apparatus with a new, improved "die" guide assembly which can overcome prior-art problems as discussed above, thereby permitting a markedly enhanced accuracy of programmed cutting to be obtained, and can generally improve the performance of traveling-wire electroerosion.

SUMMARY OF THE INVENTION

In accordance with the present invention there is provided apparatus for electroerosively cutting an electrically conductive workpiece with a continuous electrode wire, which comprises: means for axially transporting the electrode wire through the workpiece while defining a cutting zone therewith flushed with a cutting liquid medium; a pair of wire guide means disposed at opposite sides of the workpiece for providing a straight-line path for the traveling wire therebetween; power supply means for electrically energizing the said cutting zone to erosively remove material from the workpiece; and cutting feed means for relatively displacing the workpiece and the traveling electrode wire transversely along a programmed cutting path to advance the erosive material removal in the workpiece, wherein at least one of the said wire guide means comprises: a plurality of elementary guide members arranged in the direction of travel of the electrode wire and having respective wire-receptive notches, the notchered members being staggered to form a composite opening of the notches such that an imaginary cylinder which can be inscribed therein has a diameter substantially equal to a nominal diameter of the electrode wire.

Preferably, the elementary guide members in the forms of plates are supported on support means displaceably in their respective planes which are substantially parallel to one another, there being provided means for displacing the elementary guide members to change the size of the composite opening, thereby changing the diameter of the said imaginary cylinder.

BRIEF DESCRIPTION OF THE DRAWINGS

These and other features of the present invention as well as advantages thereof will become more readily apparent from a reading of the following description when taken with reference to the accompanying drawings in which.

SPECIFIC DESCRIPTION

Figure 1:
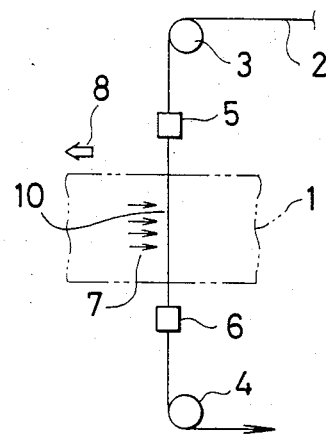
FIG. 1 is a general schematic view of a typical TW electroerosion system including a pair of wire guide means.

Referring now to FIG. 1 there is schematically shown a traveling-wire electrical machining system for erosively cutting an electrically conductive workpiece 1 by means of an electrode wire 2 which is typically as thin as 0.5 mm or less. The wire 2 dispensed from a supply reel (not shown) is advanced over a guide roll 3, through a cutting zone 10 in the workpiece 1 and over a guide roll 4, and eventually is taken up onto a take-up means (not shown). The system is also commonly provided at opposite sides of the workpiece 1 with a pair of wirepositioning guide means 5 and 6 for establishing a desired straight-line path along which the wire 2 is to axially travel under tension through the workpiece 1, thus providing a renewing electrode surface, in spacedly juxtaposed, machining relationship therewith across a machining gap flushed with a machining fluid. An electroerosive machining current, typically in the form of a succession of electrical pulses, is passed through the machining gap between the wire 2 traveling to renew the electrode surface and the workpiece 1 while the latter is transversely advanced relative to the traveling wire 2 to advance electroerosion along a programmed path in the workpiece 1.

Figure 2:
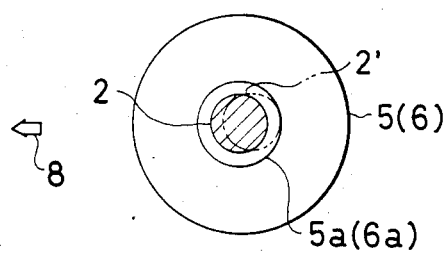
FIG. 2 is a cross-sectional view diagrammatically illustrating an electrode wire which tends to fluctuate in position within a conventional "die" guide opening.

As each of the two wire-positioning guide means 5 and 6, it has been commonly recognized to be advantageous to employ a so-called "die guide" structure with a small opening 5a, 6a which as shown in FIG. 2, is adapted to guidingly accept the traveling wire 2 therein. A "die" opening 5a, 6a is circular to conform with the wire 2 which is circular in cross section as is common. Since the traveling wire 2 stretched under tension across the guide rolls 3 and 4 remains confined within the opening 5a, 6a, it does not come off fatally in position. When this structure is used for the two guide means 5 and 6, the centers of these openings 5a and 6a establish the straight line for the axis of the wire 2 when traveling through the cutting zone to coincide with. As can be seen, it is desirable that the clearance between the wire 2 and the wall of the opening 5a, 6a be minimized so that the wire axis may suffer a minimal deviation from the straight line established by the centers of these openings. On the other hand, the opening 5a, 6a must be large enough to allow the wire 2 to be readily threaded or introduced. Thus, for example, for a wire 2 of 0.2 mm diameter, a guide opening of a diameter as large as 0.21 mm has often been found to be inadequate.

The further need for larger clearance arises especially with respect to the die guide 6 located at the downstream side of the cutting zone. The wire 2 passing out of the cutting zone shows its surface substantially roughened and small pits and projections formed thereon as are typical in rough EDM operations. If such projections are large enough, the wire 2 will be caught in the opening 6a so that its length in the cutting zone becomes slack, causing a short-circuit with the workpiece 1. Then the wire will break.

On the other hand, the larger the clearance, greater the guiding inaccuracy and hence the less the machining accuracy. In an electroerosive cutting operation, there develops in the cutting zone a machining pressure (e.g. due to machining discharges) in the direction which as shown by arrows 7 in FIG. 1 is opposite to the cutting direction indicated by arrow 8, tending to deflect the wire 2 backwards. As a result, the wire 2 in each of the guide openings 5a, 6a will, as shown in FIG. 2, be forced to assume a position 2 with respect to the cutting direction 7, in spite of high tension applied to the wire to maintain it as straight as possible across the cutting zone 10. It can therefore be seen that there results a wire guiding inaccuracy and hence a machining inaccuracy which is proportionally increased with an increase in the clearance or in the diameter of each guide opening 5a, 6a.

Figure 3:
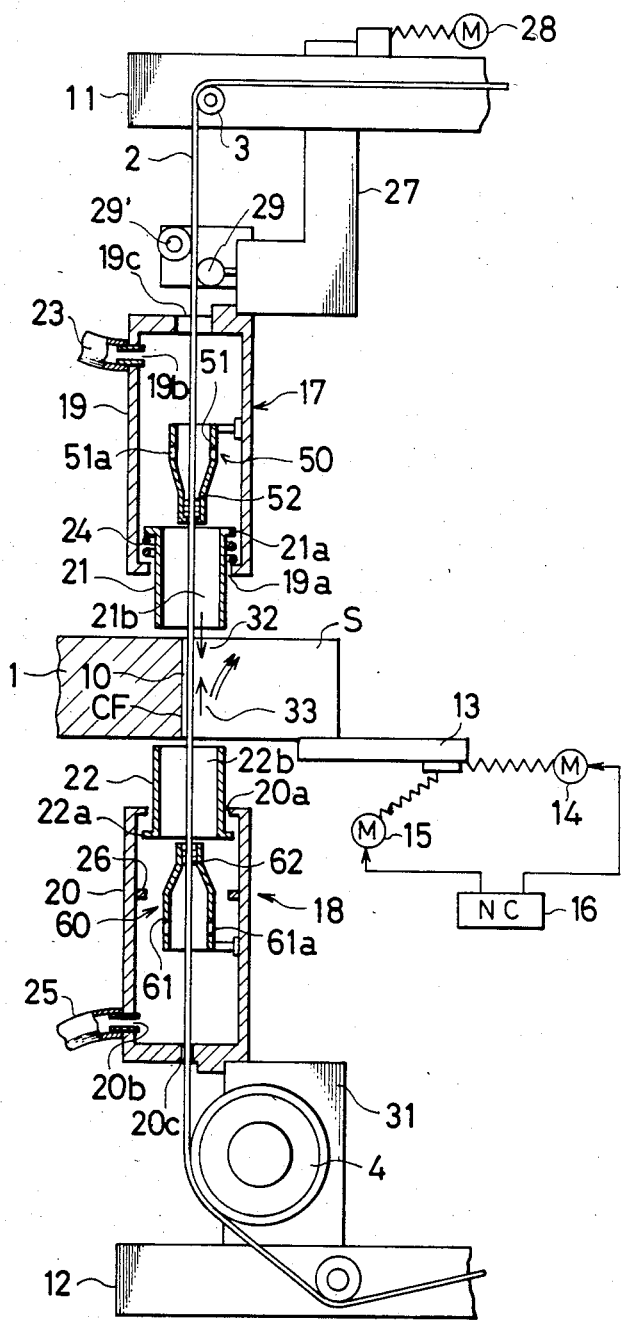
FIG. 3 is an elevational view partly in section diagrammatically illustrating a preferred form of the TW-EDM system incorporating the principles of the present invention.

In FIG. 3 there is shown, in somewhat concrete form, a preferred TW-EDM arrangement to which the principles of the present invention may be applied. As in FIG. 1, the arrangement shown here employs a downward traveling movement of the electrode wire 2 through a cutting zone 10 in the workpiece 1. The guide rolls 3 and 4 are here mounted on upper and lower arms 11 and 12, respectively, which extend parallel to each other, horizontally from a column (not shown) standing upright on a base (not shown) in the conventional EDM design. The workpiece 1 is securely mounted on a worktable 13 movably mounted typically on the machine base and which in the conventional cross-feed arrangement is driven by a pair of motors 14 and 15 designed to move the workpiece 1 along an X- and a Y-axis, respectively, in a horizontal or X-Y plane. The motors 14 and 15 are designed to be energized with drive signals furnished from an NC (numerical control) unit 16 based on a set of instructions to move the workpiece 1 relative to the electrode wire 2 along a programmed cutting path in the X-Y plane. The electrode wire 2 is continuously dispensed from a wire supply (not shown) typically mounted on the machine column and, passing over the roll 3, through the workpiece 1 and over the lower roll 4, is collected onto a conventional takeup arrangement (not shown) which may extend over the lower arm 12 and the machine column.

Shown as disposed at opposite sides of the workpiece 1 between the rolls 3 and 4 are nozzle assemblies 17 and 18 comprising cylindrical base housings 19, 20 and cylindrical nozzles 21, 22 for delivering a cutting liquid medium into cutting zone 10 defined with the traveling wire 2 in the workpiece 1 while cooling the wire 2 and the workpiece 1. The nozzle 21 in the upper assembly 17 is designed to deliver the cutting liquid medium under a relatively low pressure and the nozzle 22 in the lower assembly 18 is designed to deliver the cutting liquid medium under a relatively high pressure. The two nozzles 21 and 22, upper and lower, are coaxial with the electrode wire 2 passing therethrough. The two nozzle assemblies 17 and 18 have similar structures and are arranged essentially coaxial with each other and thus have their axes substantially coincident with a desired path of travel of the electrode wire 2 through the workpiece 1.

The upper cylindrical nozzle 21 is slidably received in the cylindrical housing 19 through a lower opening 19a formed therein. The housing 19 is provided with a fluid inlet 19b communicating via a flexible hose 23 with a cutting liquid supply unit (not shown). The nozzle 21 is formed at its upper end with a circular flange or radial extension 21a slidably received in the housing 19. The flange 21a is resiliently supported on a helical spring 24 which is in turn seated on an annular inner edge formed at the lower end of the housing 19 to define the opening 19a. In this manner, the nozzle 21 is retained by the housing 19 against falling out due to gravity and also an inlet fluid pressure acting on the flange 21a within the housing 19.

Likewise, the lower cylindrical nozzle 22 is slidably received in the cylindrical housing 20 through an upper opening 20a formed therein. The housing 20 is provided with a fluid inlet 20b which communicates via flexible hose 25 with the cutting liquid supply unit. The nozzle 22 is formed at its lower end with a circular flange or radial extension 22a slidably received in the housing 20. The flange 22a cooperates with an annular inner edge formed at the upper end of the housing 20 to define the opening 20a so that the nozzle 22 is prevented from moving out of the housing 20 due to an inlet fluid pressure acting on the flange 22a in the housing. Furthermore, the housing 20 has a ring 26 attached at a suitable height on the inner wall thereof to hold the nozzle 22 against falling due to gravity below that height.

The housing 19 of the upper nozzle assembly 17 is here securely mounted on a carriage 27 which vertically depend from the horizontal arm 11. The carriage 27 is vertically movable relative to the arm 11 by means of a motor 28 carried thereon to adjust the vertical position of the upper nozzle assembly 17. The carriage 27 is also arranged to carry a wire-energizing pin 29 to locate it immediately above the housing 19, and a guide roll 29' adjacent the energizing pin 29 to hold it in steady electrical contact with the electrode wire 2 traveling from the upper roll 3 into the upper nozzle assembly 17. The housing 19 here has an upper opening 19c coaxially surrounding the wire 2 and the opening 19c is of a diameter sufficient to allow a portion of the introduced cutting liquid medium in the housing 19 to flow out therethrough to cool the energizing pin 29 and the electrically energized wire 2 prior to entry into the upper nozzle assembly 17.

The energizing pin 29 is electrically connected to one terminal of an EDM power supply (not shown) while the workpiece 1 is electrically connected to the other terminal thereof to pass an erosion current between the workpiece 1 and the traveling wire 2 in the cutting zone. That one terminal of the power supply may also be electrically connected to the conducting roller 4 to apply the erosion current to the traveling wire 2 through a portion leaving the lower nozzle assembly 18 through a lower opening 20c formed in the housing 20. Thus, a substantial traveling length of the wire 2 which is electrically energized is held thoroughly in contact with the cutting liquid medium as coolant while moving from the energizing pin 29 through the upper nozzle assembly 17, the workpiece 1 and the lower nozzle assembly 18. The conducting guide roll 4 is rotationally mounted on a block 31 which is securely mounted on the lower horizontal arm 12.

When the housing 19, fixed in position, of the upper nozzle assembly 17 is supplied with the pressurized cutting liquid medium from the fluid supply unit, the "floating" nozzle 21 is moved down with the fluid pressure acting on the flange portion 21a and is projected from the housing 19 while directing the cutting liquid medium to flow, coaxially with the electrode wire 2, out of the nozzle opening 21b partly downwards into the workpiece 1 as shown by arrow 32 and partly laterally radially through the small annular interstice defined with the upper surface of the workpiece 1. Likewise, the nozzle 22 in the lower nozzle assembly 18 is "floated". When the housing 20 is supplied with the pressurized cutting liquid medium from the supply unit, the nozzle 22 supported on the stop ring 26 is moved up with the fluid pressure acting on the flange portion 22a and is projected from the housing 20 while guiding the cutting liquid medium to flow, coaxially with the electrode wire 2, out of the nozzle opening 22b partly upwards into the workpiece 1 as shown by arrows 33 and partly laterally radially through the small annular interstice defined with the lower surface of the workpiece 1.

The workpiece 1 has a cutting slot S electroerosively formed therein behind the electrode wire 2 as the wire is effectively moved translationally, here from right to left, in and relative to the workpiece 1 in the course of cutting feed displacement of the latter by means of the motors 14 and 15 and the feed controller 16. Electroerosion current is passed between the electrode wire 2 traveling through the workpiece 1 and a portion of the workpiece adjacent thereto across a narrow erosion gap flushed with the cutting liquid medium. A cutting front, thus progressively formed in the workpiece 1, has a semi-cylindrical surface equally spaced from the electrode wire 2 across the erosion gap spacing and is designated by reference CF. The cutting front CF and hence the cutting slot S have a narrow width, being equal to the diameter of the electrode wire 2 plus the twice the erosion gap spacing. Since the erosion gap spacing is constant or held to be always constant by relative displacement between the workpiece 1 and the wire electrode 2 effected under programmed drive commands of the feed controller 16, the machined accuracy of the cutting front CF, i.e. the accuracy of actual cutting in the workpiece 1, is a direct function of the positioning accuracy of the electrode wire 2 in the cutting zone 10.

Shown as mounted in the housings 19 and 20, respectively, are upper and lower wire-positioning guide assemblies 50 and 60 which correspond to those 5 and 6 shown in FIG. 1. The upper guide assembly 50 comprises a downwardly convergent body 51 which carries at its lower end a "composite die" guide structure 52 for slidably guiding the electrode wire 2 traveling into the workpiece 1. The tubular body 51, which thus constitutes a guide holder, is here formed with a "die" opening 51a so that the cutting liquid medium introduced through the inlet 19b may be partly diverted to flow in contact with the electrode wire 2 in the body 51 and to flow out through the opening 51a towards the nozzle opening 21b. Likewise, the lower guide assembly 60 comprises an upwardly convergent tubular body 61 which carries at its upper end a "composite diet" guide 62 for slidably guiding the electrode wire 2 traveling from the workpiece 1. The tubular body 61, which thus constitutes a guide holder, is, here again, formed with a "die" opening 61a to enable a portion of the cutting liquid medium introduced through the inlet 20b to be diverted to flow in contact with the electrode wire 2 moving in the holder 61 and to flow out through the opening 61a towards the nozzle opening 22b. In the embodiment illustrated in FIG. 3, the guide holders 51 and 61 are securely fixed to the housings 19 and 20, respectively.

In accordance with the present invention an improved "die" guide structure is provided to constitute each or one of the guides 52 and 62 which are essential for traveling-wire electroerosion as in the arrangement shown and described to assure a highly accurate positioning of the electrode wire 2 traveling through the cutting zone 10 and generally to improve the cutting performance of traveling-wire electroerosion. In general, the improved guide structure according to the invention comprises a plurality of or a series of notched elementary guide members arranged one adjacent to another in the direction of wire travel and having respective wire-receptive notches, the notched members being staggered to form a composite opening of these notches such that an imaginary cylinder which can be inscribed therein has a diameter substantially equal to a nominal diameter of the electrode wire.

Figure 4:
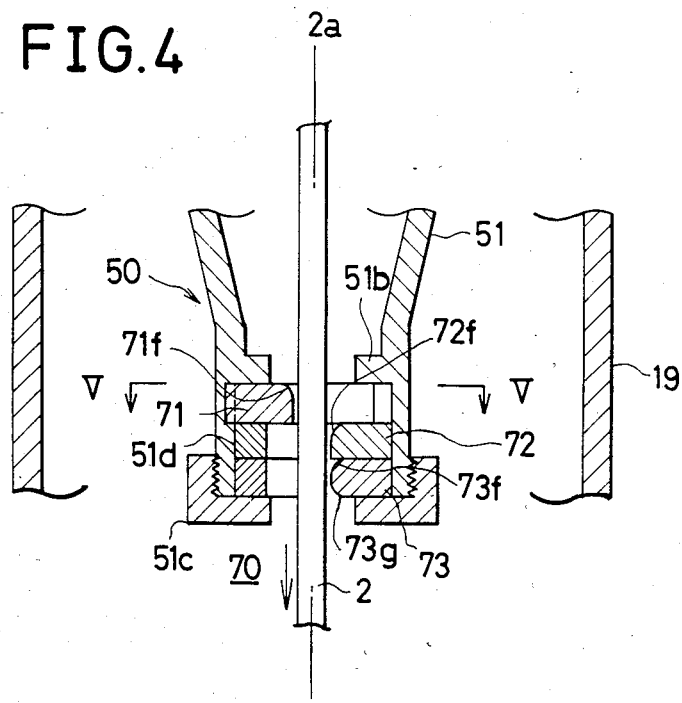
FIG. 4 is an elevational view in section schematically illustrating one embodiment of the improved wire guide structure which is designed, in accordance with the present invention, to constitute the upper and/or guide assemblies in FIG. 3.
Figure 5:
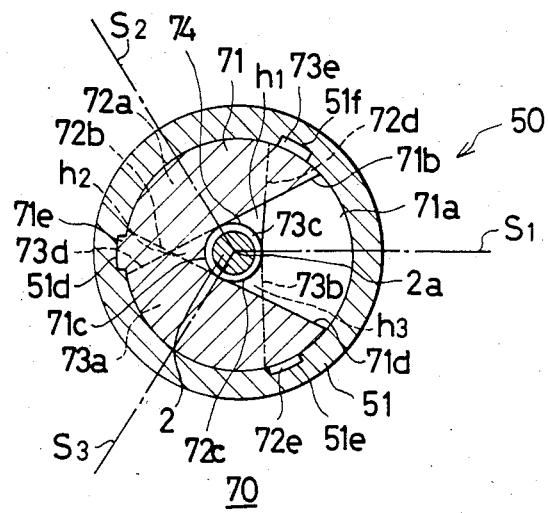
FIG. 5 is an enlarged view of a portion of the guide structure shown in FIG. 4.
Figure 6:
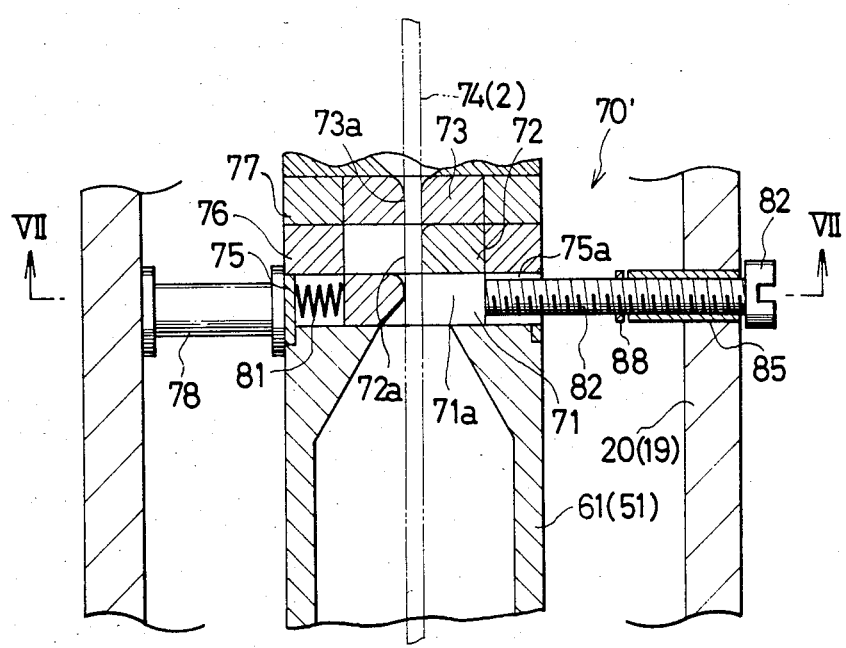
FIG. 6 is an elevational view in section diagrammatically illustrating a modified form of the "die" guide structure according to the invention.

In FIGS. 4 and 5 there is shown at 70 an embodiment of the improved "die" guide structure which makes use of three notched disks 71, 72 and 73 of an equal diameter constituting three elementary guide members. The structure is shown as making up the upper guide 52, it being noted that upon obvious modification it can also be used for the lower guide 62. The disks 71, 72 and 73 are coaxially stacked one upon another and retained in a receptacle defined between an inward annular projection 51b of the guide holder 51 and a centrally bored cap 51c threaded onto the lower end of the guide holder 51. The disks 71, 72 and 73 have formed therein with respective generally V-shaped notches or radially widening indentations 71a, 72a and 73a of an identical shape which are defined by walls 71b, 71c and 71d: 72c and 72d; and 73b, 73c, and 73d, respectively. The notched disks 71, 72 and 73 are staggered to have their notches 71a, 72a and 73a open in the directions S1, S2 and S3 which as viewed from top or down are spaced apart from one another by an angle of 120° about the axis 2a with which the electrode wire 2 is to be guided to coincide. The wire-receptive notches 71a, 72a and 73a so disposed are dimensioned to collectively make up a composite opening such that an imaginary cylinder 74 which can be inscribed therein has a diameter substantially equal to the nominal diameter of the electrode wire 2. Each disk 71, 72, 73 is integrally formed of, or alternatively has lined at least along its wire-bearing surface with, a hard, wear-resistant and low-frictional material such as diamond or sapphire.

In the arrangement illustrated, in each notched disk 71a and 72a, 73a, the side walls 71b and 71d, 72b and 72d, 73b and 73d, which define the notch 71a, 72a, 73a, are flat symmetrically about its center line coinciding with the direction S1, S2, S3. The surface area 71c, 72c, 73c can be a pair of walls made as direct extensions of these flat walls to intersect with an angle so that a space is left between that surface area and the electrode wire 2 and the wire line-contacts at two sites with the flat surfaces 71b and 71d, 72b and 72d, 73b and 73d. Preferably, however, the bottom surface area 71c, 72c, 73c of each notch 71a, 72a, 73a is rounded as shown with a radius substantially equal or slightly greater than the radius of the electrode wire 2.

As shown, each notched disk 71, 72, 73 has a longitudinal projection 71e, 72e, 73e on the side of its periphery opposite to the side in which the notch 71a, 72a, 73a is formed, the projections 71e, 72e and 73e fitting respectively in longitudinal grooves 51d, 51e and 51f, which are formed in the guide holder 51 as angularly spaced apart from one other by an angle of 120°, so that the disks 71, 73 and 73 are held against rotation. As also shown, the upper edges 71f, 72f and 73f at the notches 71a, 72a and 73a of the notched disks 71, 72 and 73 are rounded or tapered to enable the wire 2 to smoothly enter into and move through the composite "die" guide assembly 70. Thus, as shown in FIG. 4 it is desirable, for ease of wire threading, that the notch 71a at the wire inlet side have a chamfered inlet surface 71f rounded or tapered convergently in the direction of the electrode wire 2 and the notch 73a at the wire outlet side a chamfered outlet surface 73a rounded or tapered divergently in the direction of wire travel. In addition, the intermediate notch 72a and the outlet notch 73a should desirably have their inlet edges rounded at 72f and 73f so that the wire 2 can smoothly move from one guide element to another. The center or axis 2a of the imaginary cylinder 74 lies coincident with the axis of the guide holder 51, 61 which is in turn coaxial with the housing 19, 20 and the nozzle 21, 22.

Thus, if each of the disks 71, 72 and 73 is so constructed and they are so arranged as described, the electrode wire 2 can be threaded and passed through without difficulty and yet can be held to maintain its axis substantially coincident with the desired axis or straight line 2a and thus to maintain its accurate positioning relative to the workpiece 1 in the cutting zone 10. Moreover, a highly favorable and improved flushing fluid distribution through the guide unit or units 52, 62 is provided. The flushing fluid in the guide holder 51, 61 is capable of flowing in an abundant, dynamic flow through the composite opening provided by the staggered notched guide elements 71, 72 and 73 so that the electrode wire 2 passing through the "die guide" 70 is sufficiently cooled all around its surface. This is achieved by the fact that a relatively large flow passage 71a, 72a, 73a is provided by each of the guide elements 71, 72 and 73 and these passages communicate with one another around the traveling electrode wire 2 through generally triangular interstices h1 h2 and h3 as shown.

The improved guide structure 70 described is particularly advantageous for the "die" guide 62 at the downstream side of the workpiece 1 which entails more serious problems than the "die" guide 52 at the upstream side as mentioned previously. Where the structure is employed to make up at least the "die" guide 52 at the upstream side it should be noted that an imaginary cylinder 74 may be selected having a diameter even slightly less than the diameter of the electrode 2. In this case it has been found desirable that a powerful takeup mechanism at the lower guide roll 4 or downstream thereof be employed. Then the wire 2 when passing through the composite opening 71a, 72a and 73a of such a narrow effective diameter is plastically worked prior to entry into the cutting zone, thereby to increase its straightness, hence further enhancing its positioning accuracy in the cutting zone 10. It should also be noted that while in FIGS. 4 and 5 the guide elements 71, 72 and 73 are shown as arranged in contact with one another, this is not imperative. Thus, they may be vertically spaced from one another with a small spacing, say, not greater than 1 mm and made by a suitable non-guiding spacer or spacers.

Figure 7:
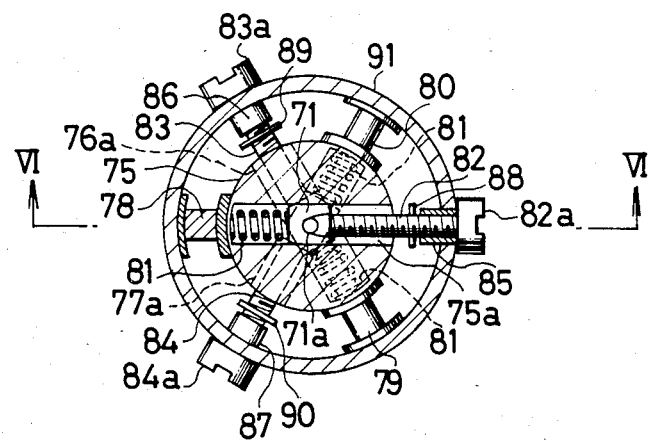
FIG. 7 is a diagrammatic cross-sectional view as taken along the line VII and as viewed in the direction of arrows in FIG. 6.

It is desirable that the diameter of the imaginary cylinder 74 and thus the size of the composite opening 71a, 72a, 73a be variably adjusted. In the modified arrangement of FIGS. 7 and 8, the elementary guide members 71, 72 and 73 having their respective notches 71a, 72a and 73a are movable, with respect to the guide holder 19, 20, along horizontal axes which are transverse to one another and as viewed from top or down are mutually spaced apart with an angle of 120°. Each of the notched members 71, 72 and 73 is here in the form of a square plate. Here again they may be integrally formed of, or alternatively have lined at least along its wire-bearing surface with, a hard, wear-resistant and low frictional material (e.g. diamond or sapphire), to provide the respective notches or openings 71a, 72a and 73a. The elementary guide members 71, 72 and 73 are slidably retained in guideways 75a, 76a and 77a formed in disk plates 75, 75 and 77, respectively, which are on the one hand bolted to a cylindrical casing 91 and on the other hand secured to the casing 91 by means of three horizontal bars 78, 79 and 80. The cylindrical casing 91 is preferably a hollow ring arranged to coaxially surround the guide holder 51, 61 and secured thereto, coaxially within the nozzle housing 19, 20. Alternatively, the casing 91 may be constituted by the cylindrical housing 19, 20 itself. A spring 81 is inserted in each guideway 75a, 76a, 77a in engagement with one side surface of each elementary guide member 71, 72, 73 to resiliently hold it therein. The other side surface of each guide member 71, 72, 73 is in engagement with the free end surface of spindle 82, 83, 84 in its guideway 75a, 76a, 77a, the spindle being the spindle portion of a screw having a head 82a, 83a disposed outside of the casing 91. The screw is threaded through a nut 85, 86, 87 in mesh therewith, which passes through the wall of the casing 91 and is secured thereto. Each spindle 82, 83, 84 has a ring stopper 88, 89, 90 mounted thereon which is engageable with the nut 85 to hold the position of each guide element 71, 72, 73 in the guideway 75a, 76a, 77a within a fixed limit.

Here again, the elementary guide notches 71a, 72a and 73a are advantageously equal to one another both in shape and size. Likewise, the elementary guide members 71, 72 and 73 and all mentioned parts respectively associatively therewith are advantageously dimensioned to be precisely equal in size, respectively. In operation, the screw heads 82a, 83a and 84a are turned to advance the guide elements 71, 72 and 73 with the spindles 82, 83 and 84 against the urging pressures of the springs 81 to a given extent, viz. until the composite opening collectively formed of the notches 71a, 72a and 73 becomes sufficiently large in size and the diameter of the imaginary cylinder (74) which can be inscribed therein becomes much larger than the nominal diameter of the electrode wire 2 used.

The screw heads 82a, 83a and 84a are then turned reverse to retract the spindles 82, 83 and 84 and to allow the guide elements 71, 72 and 73 under the urging pressures of the springs 81 to move backwards. The parallel staggering guide notches 71a, 72a and 73c are moved eccentrically above the axis 2a to reduce the diameter of the imaginary cylinder inscribed in the composite cylinder they make. The axis of the imaginary cylinder remains unchanged and coincident with the original axis as far as the notches 71a, 72a and 73a are equally shifted or the axes of the elementary guide members 71, 72 and 73 are equally spaced apart or spaced from the original axis 2a with equal distance. The diameter of the effective opening or imaginary cylinder is determined as a direct function of the eccentricity or the shift of the axis from the center 2a. A particular diameter R can be set up depending upon a particular mode of TW-EDM operation. If a rough machining operation is to be performed, the diameter R is set to be relatively large. For a finish machining operation using a wire electrode of the same diameter, a minimum of the effective wire-guide opening diameter R may be employed. Such a change is particularly important for the guide assembly 62 at the downstream side of the workpiece 1. The minimum diameter of the imaginary cylinder set to be equal to the nominal diameter of the electrode wire 2 used, is established when the three plates 71, 72 and 73 precisely overlap.

What is claimed is:

1. An apparatus for electroerosively cutting an electrically conductive workpiece with a continuous electrode wire, comprising:

means for axially transporting the electrode wire through the workpiece while defining a cutting zone therewith flushed with a cutting liquid medium;

a pair of wire guide means disposed at opposite sides of the workpiece for providing a straight-line path for the traveling wire therebetween;

power supply means for electrically energizing said cutting zone to erosively remove material from the workpiece; and cutting feed means for relatively displacing the workpiece and the traveling electrode wire transversely along a programmed cutting path to advance the erosive material removal in the workpiece, wherein at least one of said wire guide means comprises:

a plurality of planar notched members arranged in the direction of travel of the electrode wire and having respective wire-receptive notches, the notched members being staggered to form a composite opening of said notches such that an imaginary cylinder which can be inscribed therein has a diameter substantially equal to a nominal diameter of the electrode wire.

2. The apparatus defined in claim 1 wherein said notched members are supported on support means displaceably in their respective planes which are substantially parallel to one another, further comprising means for displacing said guide elements in said respective planes to change the position of said notches, thereby changing the diameter of said imaginary cylinder.

* * * * *